(12) United States Patent
Takeichi et al.

(10) Patent No.: US 10,584,791 B2
(45) Date of Patent: Mar. 10, 2020

(54) SPEED CHANGE CONTROL SYSTEM FOR AUTOMATIC TRANSMISSION

(71) Applicant: TOYOTA JIDOSHA KABUSHIKI KAISHA, Toyota-shi, Aichi-ken (JP)

(72) Inventors: Akira Takeichi, Susono (JP); Ayumu Sagawa, Toyota (JP); Hiroyasu Kitagawa, Susono (JP); Hideaki Otsubo, Aichi-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 47 days.

(21) Appl. No.: 15/906,761

(22) Filed: Feb. 27, 2018

(65) Prior Publication Data

US 2018/0252310 A1 Sep. 6, 2018

(30) Foreign Application Priority Data

Mar. 1, 2017 (JP) .................. 2017-038056

(51) Int. Cl.
| | |
|---|---|
| *F16H 61/02* | (2006.01) |
| *B60W 10/06* | (2006.01) |
| *B60W 10/11* | (2012.01) |
| *B60W 30/18* | (2012.01) |
| *F02D 41/00* | (2006.01) |
| *F16H 59/18* | (2006.01) |

(Continued)

(52) U.S. Cl.
CPC ......... *F16H 61/0213* (2013.01); *B60W 10/06* (2013.01); *B60W 10/11* (2013.01); *B60W 30/18* (2013.01); *F02D 41/0007* (2013.01); *B60W 2520/105* (2013.01); *B60W 2710/0638* (2013.01); *B60W 2710/1005* (2013.01); *F16H 59/48* (2013.01); *F16H 2061/0216* (2013.01); *F16H 2061/0227* (2013.01)

(58) Field of Classification Search
CPC ................. F16H 61/0213; F16H 59/48; F16H 2061/0216; F16H 2061/0227; F16H 2059/183; F16H 59/32; B60W 10/06; B60W 10/11; B60W 30/18; B60W 2520/105; B60W 2710/0638; B60W 2710/1005; F02D 41/0007; F02D 41/0005
See application file for complete search history.

(56) References Cited

U.S. PATENT DOCUMENTS

| | | | |
|---|---|---|---|
| 4,285,252 A | | 8/1981 | Yamaki et al. |
| 5,317,937 A | * | 6/1994 | Yoshizawa .......... F16H 61/0213 |
| | | | 477/120 |

(Continued)

FOREIGN PATENT DOCUMENTS

| | | |
|---|---|---|
| JP | S5536140 A | 3/1980 |
| JP | 2009001166 A | 1/2009 |

(Continued)

*Primary Examiner* — Tinh Dang
(74) *Attorney, Agent, or Firm* — Hunton Andrews Kurth LLP

(57) ABSTRACT

A speed change control system configured to allow a driver to promptly sense a response to an accelerating operation. A reference index value that the driver senses an acceleration response is calculated based on acceleration of a vehicle. If the reference index value is smaller than a first reference index value at which the driver is allowed to sense the acceleration response, a downshift point is lowered to a first drive force.

11 Claims, 10 Drawing Sheets

(51) Int. Cl.
*F16H 59/32* (2006.01)
*F16H 59/48* (2006.01)

(56) References Cited

U.S. PATENT DOCUMENTS

| | | | | |
|---|---|---|---|---|
| 5,484,350 | A * | 1/1996 | Ishikawa | F16H 61/0213 |
| | | | | 477/120 |
| 7,993,243 | B2 * | 8/2011 | Silveri | B60K 6/52 |
| | | | | 477/125 |
| 8,277,360 | B2 * | 10/2012 | Matsubara | B60K 6/365 |
| | | | | 477/3 |
| 9,487,213 | B2 * | 11/2016 | Yanagida | B60W 10/02 |
| 2008/0318726 | A1 | 12/2008 | Matsubara et al. | |
| 2014/0019021 | A1 * | 1/2014 | Yanagida | B60W 10/02 |
| | | | | 701/54 |
| 2016/0312889 | A1 | 10/2016 | Kato et al. | |
| 2017/0059035 | A1 | 3/2017 | Okamura | |

FOREIGN PATENT DOCUMENTS

| | | | |
|---|---|---|---|
| JP | 2010070040 A | 4/2010 |
| JP | 2014111418 A | 6/2014 |
| JP | 2015040611 A | 3/2015 |
| JP | 2016205518 A | 12/2016 |
| JP | 2017048916 A | 3/2017 |

* cited by examiner

SPEED CHANGE CONTROL SYSTEM FOR AUTOMATIC TRANSMISSION

CROSS REFERENCE TO RELATED APPLICATION

The present disclosure claims the benefit of Japanese Patent Application No. 2017-038056 filed on Mar. 1, 2017 with the Japanese Patent Office.

BACKGROUND

Field of the Invention

Embodiments of the present disclosure relate to a speed change control system for an automatic transmission in which a speed ratio is changed stepwise.

Discussion of the Related Art

JP-A-55-36140, JP-A-2015-40611, and JP-A-2009-1166 disclose a speed change control system of a geared automatic transmission which is configured to change a gear stage according to an accelerator position or an accelerator opening level and a vehicle speed. The speed change control system disclosed in JP-A-55-36140 includes a shifting program which is executed in a case where a vehicle runs on a slope of a steep gradient, and a transmission program which is executed in a case where the vehicle runs on an even road of a small gradient. Specifically, in a case where the vehicle runs on a uphill road, the vehicle is downshifted at a high speed even in the case of running on the even road. According to the disclosure of JP-A-55-36140, the speed change control system is configured to calculate an expected acceleration in the case of running on the even road from the accelerator position and the vehicle speed at the time of running, and differentiate the vehicle speed to calculate an actual acceleration. The speed change control system of JP-A-55-36140 compares the expected acceleration with the actual acceleration to determine whether the road is an uphill road, and selects a transmission program which is appropriate to the present running road. Specifically, in the transmission program, the downshifting is executed when the accelerator position exceeds a predetermined position at a predetermined vehicle speed. With this regard, in a case where the vehicle runs on the uphill road, the vehicle speed to be downshifted is changed to lower a downshift point.

In a case where the accelerator opening is kept to a predetermined degree to run on the uphill road, the vehicle speed may be lowered with respect to a required drive force. In this situation, in a case where the vehicle speed is smoothly lowered, it takes time for the downshifting until the vehicle speed is lowered to a reference speed. As a result, there is a concern that a driver senses the downshifting delay. In order to solve such a problem, the speed change control system disclosed in JP-A-2015-40611 is configured to execute the downshifting when the vehicle is decelerated for a predetermined time or more even in a case where the vehicle speed is not lowered to the vehicle speed for the determination of the downshifting.

A gear stage of the geared automatic transmission is selected in accordance with the accelerator position and the vehicle speed in an optically fuel efficient manner, and fuel consumption of the engine is governed by a speed and a torque of the engine. Therefore, when the speed of the engine is delayed with respect to a change in the accelerator position, there is a concern that the engine could not operate at an operating point of good fuel consumption. In order to solve such a defect, the speed change control system disclosed in JP-A-2009-1166 is configured to increase the accelerator position of the downshift point in a case where the accelerator position is steeply increased compared to a case where the accelerator position is smoothly increased.

JP-A-2016-205518 describes a control system for a continuously variable transmission in which a speed ratio is varied continuously. In a case where the speed change control system disclosed in JP-A-2016-205518 is configured to change the speed ratio of the transmission stepwise in a case where the accelerator opening level is steeply increased. With this regard, the speed change control system is configured to temporarily set an intermediate speed ratio between a target speed ratio determined from the accelerator opening level and the current speed ratio. Specifically, the intermediate speed ratio is set to make a time for the acceleration plateau become longer as a temporarily plateauing acceleration is increased.

As disclosed in JP-A-55-36140 and JP-A-2015-40611, the required drive force can be output promptly by executing the downshifting early in a case where the vehicle runs on the uphill road. However, a time from an acceleration request to a point when the driver senses an increase of the acceleration is changed depending on responses of a prime mover and an automatic transmission, and a friction coefficient between drive wheels and the road. Therefore, even in a case where the vehicle runs on an even road, there is a concern that the driver senses the acceleration late.

In addition, the acceleration of the vehicle and a change rate of the acceleration vary according to a characteristic of the prime mover and an operation condition. Therefore, even when the change rate of the accelerator position is great, there is a concern that the vehicle is not accelerated promptly during a period until the downshifting is executed. In such a case, there is a concern that the driver is not able to sense a change in behavior of a vehicle caused by an accelerating operation. On the other hand, in the disclosure of JP-A-2009-1166, in a case where the change rate of the accelerator position is great, the accelerator position of the downshift point is set to be great. In other words, an operating region where the downshifting is not executed is increased. Therefore, a time to execute the downshifting becomes long, and a time when the driver is not able to sense an increase in acceleration caused by the accelerating operation.

SUMMARY

Aspects of the present disclosure have been conceived noting the foregoing technical problems, and it is therefore an object of the present disclosure to provide a speed change control system configured to allow a driver to promptly sense a response to an accelerating operation.

A speed change control system of an automatic transmission according to the embodiment comprises: an automatic transmission adapted to change a speed ratio stepwise that is arranged between an engine serving as a prime mover of a vehicle and a drive wheel; and a controller that transmits a downshift command when a required drive force is increased higher than a predetermined downshift point. In order to achieve the above-explained objective, according to the embodiment, the controller is configured to: calculate a reference index value based on a change in the acceleration of the vehicle that a driver senses a response of an acceleration with an increase in the index value; and lower the downshift point to a first drive force when the reference index value is equal to or smaller than a first reference index value at which the driver is allowed to sense the response of the acceleration, in comparison with that of a case in which the reference index value is greater than the first reference index value.

In a non-limiting embodiment, the reference index value may include a stimulation intensity calculated by multiplying the change in the acceleration from a point at which the vehicle starts accelerating to a point at which the driver senses that the acceleration plateaus, by a jerk from a point at which the vehicle starts accelerating to a point at which the driver senses that the acceleration plateaus.

In a non-limiting embodiment, the controller may be further configured to: calculate a change rate of the required drive force; set a jerk from a point at which the vehicle starts accelerating to a point at which the driver senses that the acceleration plateaus as the reference index value, when the change rate of the required drive force is smaller than a first speed; calculate a stimulation intensity by multiplying the change in the acceleration from the point at which the vehicle starts accelerating to the point at which the driver senses that the acceleration plateaus by the jerk from the point when the vehicle starts accelerating to the point at which the driver senses that the acceleration plateaus; and set the calculated stimulation intensity as the reference index value when the change rate of the required drive force is equal to or greater than the first speed.

In a non-limiting embodiment, the controller may be further configured to: calculate an index value based on the acceleration of the vehicle that the driver senses an acceleration plateau when the index value is not increased; determine whether the index value is increased; and lower the downshift point to the first drive force when the index value is not increased, in comparison with that of a case in which the index value is increased.

In a non-limiting embodiment, the index value may include a value calculated by multiplying the change in the acceleration from the point at which the vehicle starts accelerating by a temporal change rate of the acceleration obtained by dividing the change of acceleration by an elapsed time from a point at which the vehicle starts accelerating.

In a non-limiting embodiment, the controller may be further configured to: calculate a change rate of the required drive force; set the acceleration of the vehicle as the index value when the change rate of the required drive force is smaller than a second speed; and calculate a value by multiplying the change in the acceleration from the point at which the vehicle starts accelerating, by the temporal change rate of the acceleration calculated by dividing the change of the acceleration by an elapsed time from a point at which the vehicle starts accelerating; and set the calculated value as the index value (In) when the change rate of the required drive force is equal to or greater than the second speed.

In a non-limiting embodiment, the controller may be further configured to: predict a final drive force required by the driver; determine whether the predicted required drive force pap(fin) exceeds the downshift point; and transmit a downshift command when the predicted required force exceeds the downshift point, even if a current required drive force does not exceed the first drive force.

In a non-limiting embodiment, the speed change control system may further comprise a supercharger that supplies a pressurized air to the engine. In addition, the controller may be further configured to: operate the supercharger when a torque required for the engine is equal to or greater than a predetermined torque; calculate the predetermined torque to operate the supercharger; and set the first drive force to a drive force at which the torque required for the engine becomes the predetermined torque.

In a non-limiting embodiment, the automatic transmission may be adapted to shift a gear stage at least among a current gear stage, the first gear stage in which the speed ratio is greater than that in the gear stage, and a second gear stage in which the speed ratio is greater than that in the first gear stage. In addition, the controller may be further configured to: shift the gear stage from the current gear stage to the first gear stage when the required drive force in the current gear stage is increased higher than a first downshift point, shift the gear stage from the first gear stage to the second gear stage when the required drive force in the first gear stage is increased higher than a second downshift point which is high than the first downshift point, and lower the first downshift point to a second drive force that is smaller than that of a case in which the index value is increased, and lower the second downshift point to a third drive force that is smaller than that of a case in which the index value is increased, when the index value is not increased.

In a non-limiting embodiment, the controller may be further configured to: obtain the change rate of the required drive force, reduce the second drive force to a value smaller than that of a case in which the change rate of the required drive force is smaller than the third speed, and reduce the third drive force to a smaller value, when the change rate of the required drive force is equal to or greater than a third speed.

In a non-limiting embodiment, the automatic transmission may be further adapted to establish a third gear stage in which a speed ratio is greater than that in the second gear stage. In addition, the controller may be further configured to: shift the gear stage to the third gear stage when the required drive force in the second gear stage is increased higher than a third downshift point which is greater than the second downshift point; lower the third downshift point to a fourth drive force which is smaller than that of a case in which the index value is increased, when the index value (In) is not increased; calculate the change rate of the required drive force; and set the third drive force and the fourth drive force in such a manner that a difference between the second drive force and the third drive force and a difference between the third drive force and the fourth drive force are equalized, when the change rate of the required drive force is smaller than a fourth speed.

According to the disclosure, the index value indicating that the driver senses the acceleration response is determined on the basis of the change of acceleration of the vehicle. If the index value is equal to or smaller than the first reference index value at which the driver is allowed to sense the acceleration response, the downshift point is lowered. In other words, if the index is equal to or smaller than the first reference index value, the timing of executing the downshifting is advanced. As a result, it is possible to shorten a time from the accelerating operation to a point when the driver senses the response to the accelerating operation. In other words, it is possible to prevent the response delay with respect to the accelerating operation.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
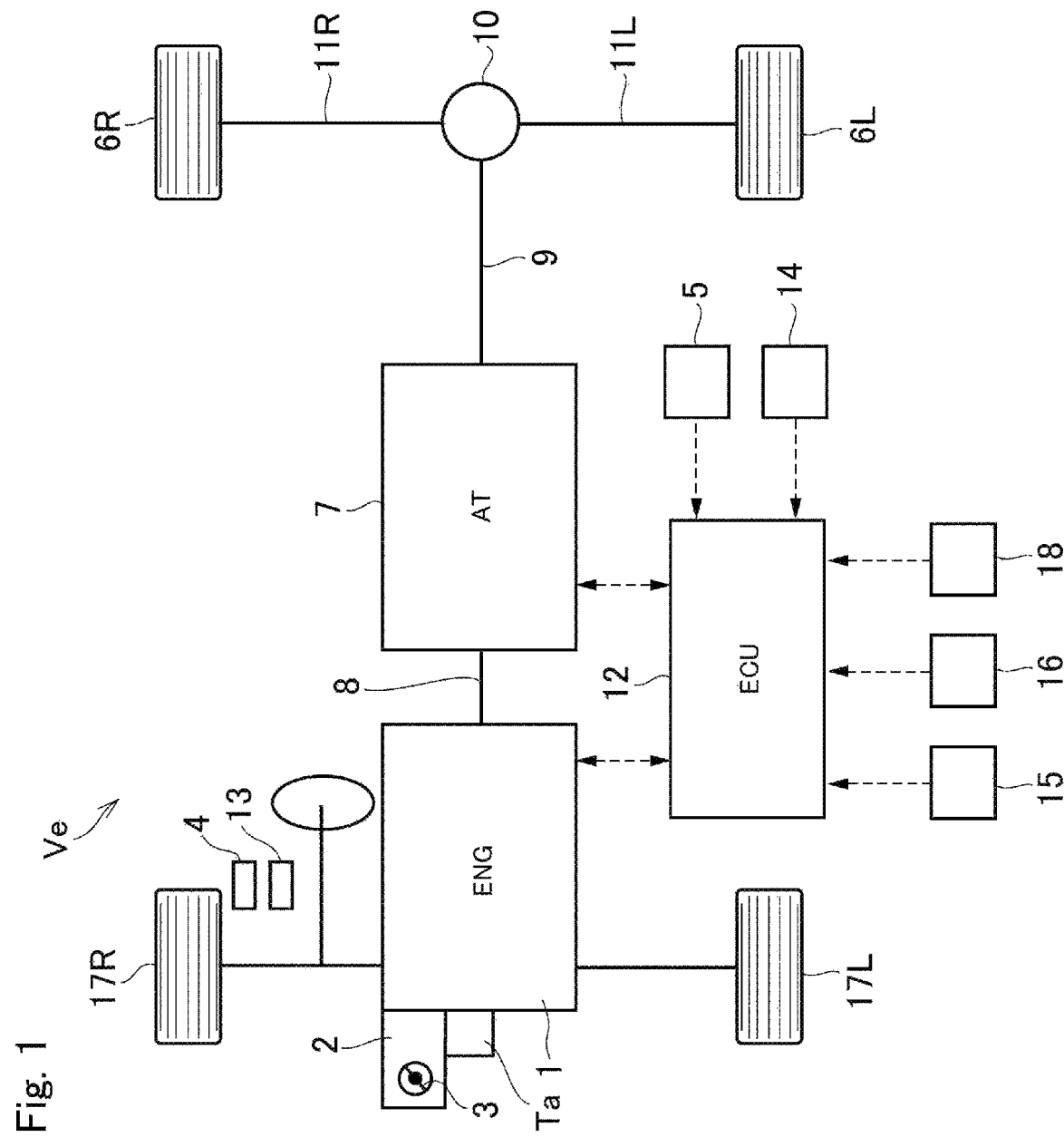
FIG. 1 is a schematic illustration showing a structure of the vehicle to which the control system according to the embodiment is applied.

FIG. 1 illustrates an example of a vehicle which is provided with an automatic transmission according to an embodiment of the disclosure. A vehicle Ve illustrated in FIG. 1 is provided with an engine (ENG) 1 as a prime mover. Similarly to a gasoline engine or a diesel engine in the related art, the engine 1 includes an electronic throttle valve 2 which controls an intake air of the engine 1 and an air flow meter 3 which detects the intake air. In the example illustrated in FIG. 1, the engine 1 further includes a supercharger Ta which supplies a compressed air to the engine 1 in a case where a torque equal to or greater than a predetermined torque is required.

An electronic throttle valve 2 is adapted to detect a position of an accelerator pedal 4 by an acceleration sensor 5 and to electrically control the intake air of the engine 1 according to the detected position of the accelerator pedal.

The vehicle Ve illustrated in FIG. 1 is a front-engine rear-drive layout vehicle in which torque of the engine 1 is delivered to a pair of rear wheels 6R and 6L to propel the vehicle Ve. An automatic transmission (AT) 7 is disposed in a torque transmission route between the engine 1 and the rear wheels 6R and 6L to change an operating point (mainly a speed) of the engine 1. A transmission shaft of the engine 1 is connected to a torque converter and a torque converter clutch which are not illustrated in the drawing. A transmission shaft (i.e., a turbine shaft) 8 of the torque converter is connected to the automatic transmission 7.

A speed ratio of the automatic transmission 7 can be changed stepwise. For example, a geared automatic transmission that execute a speed change operation by manipulating an engagement device such as a clutch and a brake to change the torque transmission route may be used as the automatic transmission 7. Alternatively, a belt-driven continuously variable transmission in which a speed ratio is varied continuously by changing an effective running diameter of a belt applied to a pulley, or a continuously variable transmission serving as a hybrid mechanism that continuously changes a speed of the engine 1 connected to a power split mechanism by a motor-generator also connected to the power split mechanism, may be used as the automatic transmission 7. In a vehicle having the continuously variable transmission, a plurality of speed ratios or gear stages are set in advance so that the speed can be changed stepwise.

A transmission shaft of the automatic transmission 7 is connected to drive wheels 6R and 6L through a propeller shaft 9, a differential gear 10, and drive shafts 11R and 11L.

A shifting operation of the automatic transmission 7 is controlled by an electronic control unit (to be abbreviated as the "ECU" hereinafter) 12 as a controller. The ECU 12 is composed mainly of a microcomputer that is configured to carry out a calculation based on input data and preinstalled data, and to transmit a calculation result in the form of command signal. The ECU 12 receives data from the acceleration sensor 5 which detects the position of the accelerator pedal 4, a brake sensor 14 which detects an operating amount (a depression or a pedal force) of a brake pedal 13, a sensor 15 which detects an engine speed, a sensor 16 which detects the speed of the output shaft of the automatic transmission 7, the air flow meter 3, and a wheel speed sensor 18 which detects the speeds of wheels (a pair of front wheels 17R and 17L and a pair of rear wheels 6R and 6L). Those data are stored in the ECU 12 for a predetermined time.

Specifically, a shift map, a control flow, the input signals formulas for data processing and so on are stored in the ECU 12.

In order to control the output of the engine 1, the ECU 12 transmits the result of the data processing to a fuel supply valve, an ignition plug, and the electronic throttle valve (neither of which are shown) in the form of control signals. Given that the automatic transmission 7 is a geared automatic transmission, the ECU 12 transmits a downshift command to control the engagement device of the geared automatic transmission. In addition, the ECU 12 transmits the signals to the other devices such as a lock-up clutch (not illustrated).

Figure 2:
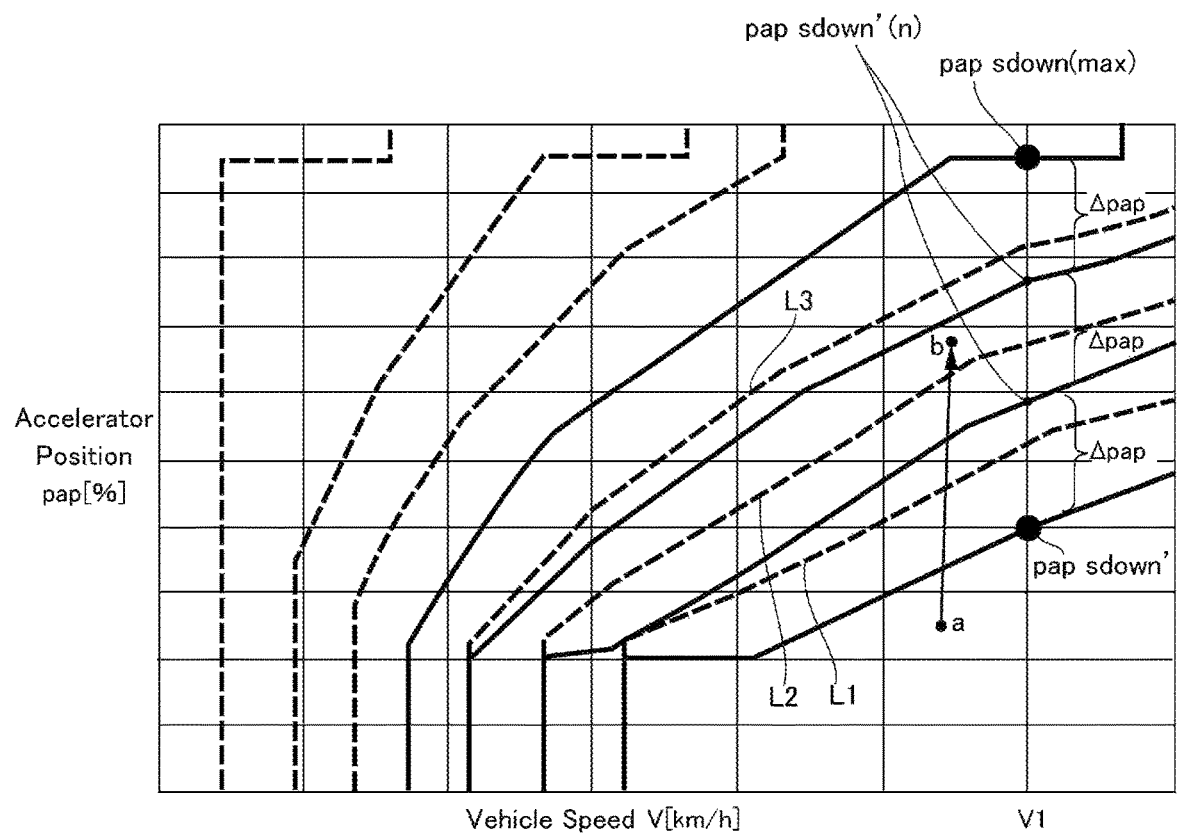
FIG. 2 shows one example of a shift map.

As illustrated in FIG. 2, in the shift map installed in the ECU 12, the gear stages of a geared transmission are determined on the basis of an operating point governed by a vehicle speed V and a position of the accelerator pedal (required drive force) pap. In FIG. 2, the horizontal axis represents the vehicle speed V, the vertical axis represents the position of the accelerator pedal pap, the dashed lines are downshift lines, and the solid lines are downshift lines based on a lowered downshift point pap(sdown) to be described below. In FIG. 2, upshift lines are omitted for the sake of convenience. Specifically, a determination to execute a downshifting is made when the vehicle speed V is reduced across the downshift line from right to left in FIG. 2, and when the position of the accelerator pedal 4 is increased across the downshift line from the lower side to the upper side in FIG. 2. As a result, the gear stage to be established is determined. For example, when the position of the accelerator pedal pap is increased from the current operating point "a" establishing the current gear stage to point "b", the gear stage is shifted to the stage two stages lower than the current stage. Accordingly, the accelerator pedal pap on the downshift line corresponds to "downshift point" in the embodiment.

In addition, in the embodiment, the gear stage established when the operating point is situated at point "a" in FIG. 2 corresponds to the "current gear stage", the gear stage established when the operating point is shifted across the line L1 in FIG. 2 corresponds to the "first gear stage", the gear stage established when the operating point is shifted across the line L2 in FIG. 2 corresponds to the "second gear stage", and the gear stage established when the operating point is shifted across the line L3 in FIG. 2 corresponds to the "third gear stage". Further, the operating pint on the line L1 corresponds to the "downshift point" or the "first downshift point", and the operating point on the line L2 corresponds to the "second downshift point", and the operating point on the line L3 corresponds to the "third downshift point".

Further, when the operating point is shifted across a plurality of downshift lines, a skipshift may be executed to downshift the gear stage while skipping at least one stage. Alternatively, the gear stage may be changed stage by stage. The vehicle speed V may be obtained on the basis of data from the sensor 16 which detects the speed of the output shaft of the automatic transmission 7 and the wheel speed sensor 18. The required drive force may also be determined on the basis of a detection value of a sensor which detects an opening degree of a throttle valve (not shown) instead of the position of the accelerator pedal pap.

Figure 3:
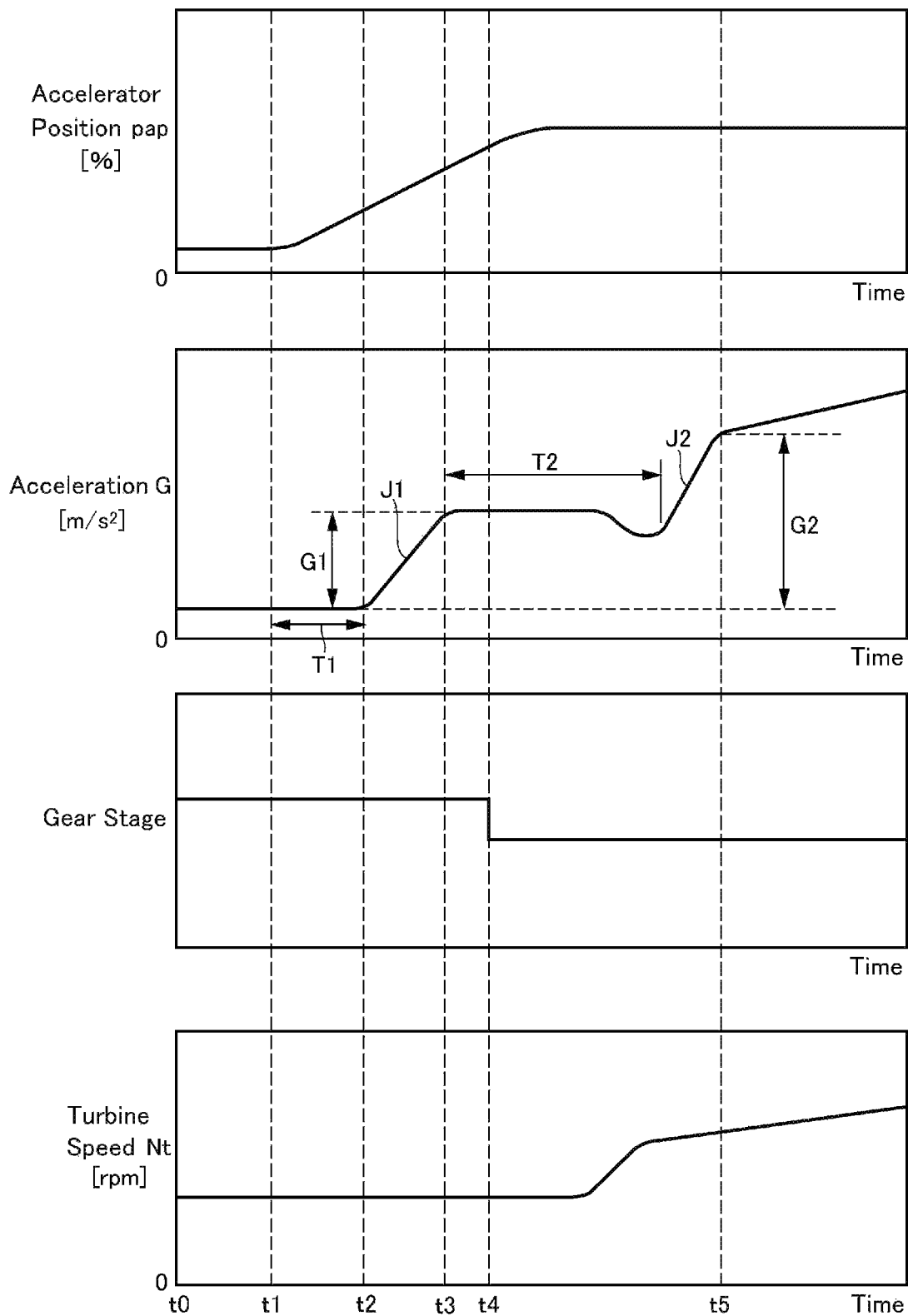
FIG. 3 is a time chart indicating temporal changes in a position of an accelerator pedal, an acceleration, a command signal to set a gear stage, and a change in turbine speed, during execution of a power-on downshifting.

FIG. 3 illustrates temporal changes in the position of the accelerator pedal pap, an acceleration G, a command signal to set the gear stage, and a turbine speed Nt during execution of the downshifting with reference to the shift map when acceleration is demanded. At point to, the position of the accelerator pedal pap is substantially "0". In this situation, the acceleration G is kept constant to a value slightly smaller than "0" due to friction and a road load (running resistance) of the engine 1. In other words, the vehicle Ve is decelerated gradually. However, a change in the vehicle speed V is small since the deceleration is small. As a result, the turbine speed Nt is also kept almost constant.

At point t1, when the accelerator pedal 4 is depressed to accelerate the vehicle Ve, a signal to increase the output torque of the engine 1 is transmitted from the ECU 12. As a result, the output torque of the engine 1 is increased at a timing slightly delayed from the timing at which the signal is transmitted. Consequently, the acceleration G starts increasing from at point t2. At point t2, since the position of the accelerator pedal pap does not exceed the downshift line of the shift map, the gear stage is maintained to the current stage.

When the acceleration G is increased to a predetermined value at point t3, the output torque of the engine 1 is increased to a maximum torque. In addition, an operating point of the engine 1 shifts from an NA region where the engine 1 is operated in a natural aspiration manner to a supercharge region where an air compressed by the supercharger Ta is aspirated. In this situation, the acceleration G is kept constant due to a response delay. When the position of the accelerator pedal pap exceeds the downshift line of the shift map at point t4, the ECU 12 transmits a signal to carry out the downshifting to a gear stage of a larger speed ratio. As a result, an engagement device of the automatic transmission 7 is engaged or released, and the turbine speed Nt is gradually increased. However, the output torque of the engine 1 does not serve as a drive force in an inertia phase of a shift transitional phase. Therefore, the acceleration G is temporarily reduced, and then starts increasing gradually. Thereafter, the downshift is completed at point t5.

The applicant of this application discloses a fact that a driver senses acceleration (response) of the vehicle caused by an accelerating operation depending on a change ΔG of the acceleration G from a point at which the accelerating operation is executed, and a magnitude of a jerk J during accelerating the vehicle Ve. For example, as described in JP-A-2016-099602, an acceleration sensed by the driver is changed according to a stimulation intensity Mi obtained by multiplying the change ΔG of acceleration and the magnitude of the jerk J, a plateau period T1 from the accelerating operation to a point when the acceleration starts changing, and a plateau period T2 from a point when an orienting reaction occurs to a point when the acceleration G restarts increasing. Specifically, according to an experiment performed by the applicant of this application, it has been found out that the driver may not always sense a response to an accelerating operation even if the acceleration of the vehicle Ve was changed. Details of the such experiment are described in JP-A-2016-099602.

Figure 4:
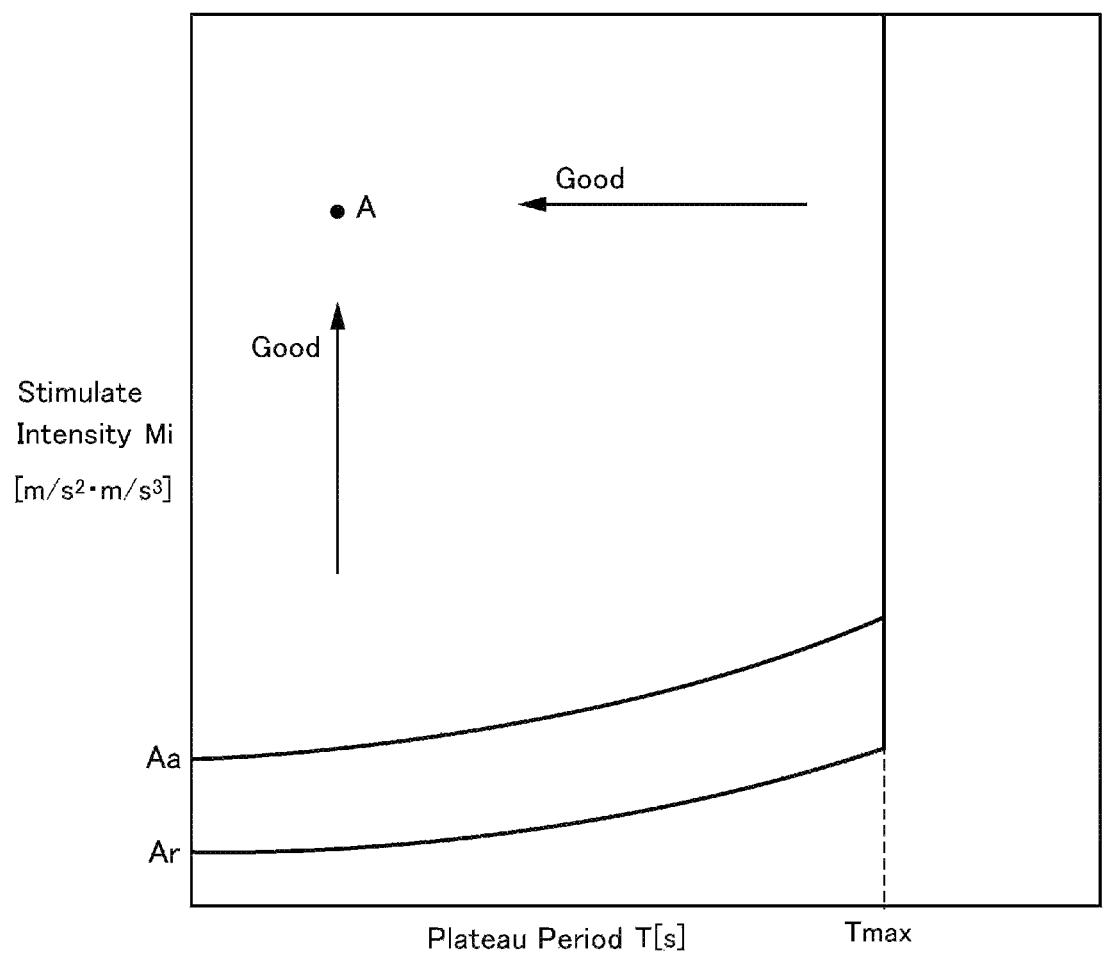
FIG. 4 is a graph showing an experimental result of a response to an accelerating operation according to a stimulation intensity and a plateau period, and a degree that a driver senses an acceleration.

The experiment result of the applicant of this application is illustrated in FIG. 4. The horizontal axis in FIG. 4 represents a plateau period T, and the vertical axis represents the stimulation intensity Mi. As indicated in FIG. 4, the acceleration feeling (or an acceleration response) is increased with an increase in the stimulation intensity Mi toward point A, and with a reduction in the plateau period T toward point A. In FIG. 4, Tmax is a maximum period of time in which the driver does not sense a response delay with respect to the accelerating operation. Further, curve Ar represents a lower limit value (to be called the "first threshold value" hereinafter) of the stimulation intensity Mi at which the driver can sense a change in behavior of a vehicle caused by the accelerating operation, and curve Aa represents a lower limit value (to be called the "second threshold value" hereinafter) of the stimulation intensity Mi at which the driver can sense the acceleration.

In the experiment, a first stimulation intensity Mi1 when the output torque of the engine 1 was increased was obtained by multiplying the acceleration represented by G1 in FIG. 3 by the jerk represented by J1 in FIG. 3. A second stimulation intensity Mi2 when the drive force was increased by downshifting was obtained by multiplying the acceleration represented by G2 in FIG. 3 by the jerk represented by J2 in FIG. 3. Given that the first stimulation intensity Mi1 is equal to or greater than the first threshold Ar but less than the second threshold Aa, the driver could not sense an acceleration. In this case, however, the driver could sense a change in behavior of the vehicle Ve caused by the accelerating operation. On the contrary, if the first stimulation intensity Mi1 is equal to or greater than the second threshold Aa, the driver could sense an acceleration.

In a case where the first stimulation intensity Mi1 was less than the first threshold Ar, the driver could not sense a response to the accelerating operation, that is, a change in behavior of the vehicle Ve. In this case, when the second stimulation intensity Mi2 became equal to or greater than the first threshold Ar, the driver could sense a change in behavior of the vehicle Ve since the commencement of the accelerating operation. In this case, therefore, the driver felt that response to the accelerating operation was unsatisfactory.

The speed change control system according to the embodiment is configured such that the driver is allowed to promptly sense a change in behavior of the vehicle Ve caused by the accelerating operation. Specifically, the speed change control system is configured to advance the timing of executing the downshifting by carrying out the routine shown in FIG. 5. At step S1, a change in a position of the accelerator pedal dpap is calculated. Then, at step S2, it is determined whether the change in a position of the accelerator pedal dpap is equal to or greater than a third threshold value α. In other words, steps S1 and S2 are executed to determine whether an acceleration is demanded by the driver. For this purpose, the change in a position of the accelerator pedal dpap can be obtained on the basis of data detected by the acceleration sensor 5. Specifically, the third threshold value α is set to a value possible to determine whether the driver intends to accelerate.

The routine is executed to determine a possibility of execution of a power-on downshifting to shift the gear stage to the lower stage, so as to achieve the required drive force to accelerate the vehicle. To this end, if the change in a position of the accelerator pedal dpap is smaller than the third threshold value α so that the answer of step S2 is NO, the routine returns.

By contrast, if the change in the position of the accelerator pedal dpap is equal to or greater than the third threshold a so that the answer of step S2 is YES, it is determined whether the acceleration plateaus. If the acceleration plateaus, the driver may recognize a commencement of the shifting operation of the automatic transmission 7 when the acceleration plateau starts. In other words, the time T2 shown in FIG. 3 from a point at which the acceleration plateau starts to a point at which the driver senses a change in acceleration G may be recognized as a time required for the shifting operation. That is, the driver may feel a response delay with respect to the shifting operation. Therefore, if the acceleration plateaus, the timing of executing the downshifting is advanced.

The acceleration plateau is determined on the basis of a change in an index value In. Specifically, the index value In is obtained based on: an increase ΔG of the acceleration from the acceleration demand; and a product of the increase ΔG of the acceleration and a temporal change rate ΔG/Δt of the acceleration obtained by dividing the increase ΔG of the acceleration G by an elapsed time Δt from a point at which the acceleration G starts increasing. As a result of the above-explained experiment, it has been confirmed that the driver senses the acceleration plateau if the index value In is not increased. For example, if the increase ΔG of the acceleration is small and an increasing time of the acceleration is long, the temporal change rate ΔG/Δt of the acceleration is reduced. As a result, the index value In is not increased and hence it is possible to determine an acceleration plateau according to an actual driver's sense.

Specifically, if the change in the position of the accelerator pedal dpap is equal to or greater than the third threshold a so that the answer of step S2 is YES, the routine progresses to step S3 to obtain the point t at which the accelerator pedal 4 is depressed, the acceleration G, and the position of the accelerator pedal pap from the ECU 12. Then, at step S4, the change ΔG of the acceleration from a time point at which the acceleration is demanded to the present time, and the temporal change rate ΔG/Δt of the acceleration are calculated. Here, it is to be noted that the temporal change rate ΔG/Δt of the acceleration is different from an actual change rate of acceleration (i.e., jerk).

Thereafter, at step S5, it is determined whether a current index value In(i) is equal to or smaller than an index value In(i−1) calculated in the last routine. Specifically, the current index value In(i) may be obtained on the basis of the change ΔG and the temporal change rate ΔG/Δt of the acceleration calculated at step S4 in the current routine. On the other hand, the index value In(i−1) may be obtained on the basis of a change ΔG(i−1) and a temporal change rate ΔG(i−1)/Δt(i−1) of the acceleration calculated at step S4 in the last routine.

If the current index value In(i) is equal to or greater than the index value In(i−1) of the last routine so that the answer of step S5 is NO, it is determined that the acceleration does not plateau. In this case, the routine is returned without changing the timing of executing the downshifting, and the downshifting is executed with reference to a normal shift map.

By contrast, if the current index value In(i) is smaller than the index value In(i−1) of the last routine so that the answer of step S5 is YES, this means that the acceleration plateaus. In this case, it is preferable to advance the timing of executing the downshifting. However, if the acceleration plateau is caused due to response delay of the case in which the operating point of the engine 1 is shifted from the NA region to the supercharge region, there may be no need to execute the downshifting by operating the supercharger Ta. In such a case, if the timing of executing the downshifting is advanced, the drive force may be excessively increased or the fuel consumption may be increased. In addition, if the first stimulation intensity Mi1 does not exceed the first threshold Ar even if an engine torque is increased, it will take longer time for the driver to sense a change in behavior of the vehicle Ve caused by the accelerating operation.

Therefore, if the current index value In(i) is smaller than the index value In(i−1) of the last routine so that the answer of step S5 is YES, the routine progresses to step S6 to determine whether the first stimulation intensity Mi1 corresponding to the "reference index value" in this embodiment is equal to or smaller than the first threshold Ar corresponding to the "first reference index value" in this embodiment. If the first stimulation intensity Mi1 is greater than the first threshold Ar so that the answer of step S6 is NO, it is determined that the driver has sensed a response with respect to the accelerating operation. In this case, therefore, the routine returns.

By contrast, if the first stimulation intensity Mi1 is equal to or smaller than the first threshold Ar so that the answer of step S6 is YES, it may take longer time for the driver to sense a change in behavior of the vehicle Ve caused by the accelerating operation is excessively increased. In this case, the routine progresses to step S7 to lower a predetermined downshift point in the shift map to cause the downshifting earlier by a smaller depression of the accelerator pedal 4 than that in the normal condition. Thereafter, the routine returns. Such alteration of the downshift point at step S7 may be executed not only by modifying the shift map shown in FIG. 2 but also with reference to other specific shift map.

Figure 5:
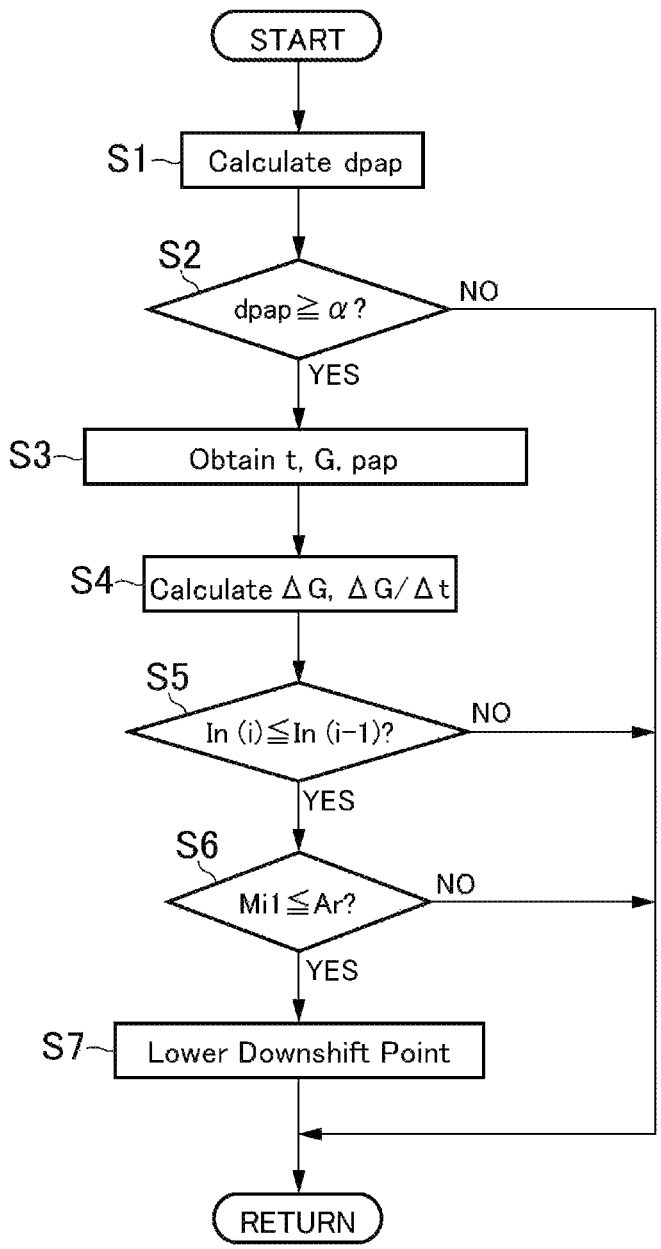
FIG. 5 is a flowchart showing a routine to determine whether to advance a timing to execute a downshifting.
Figure 6:
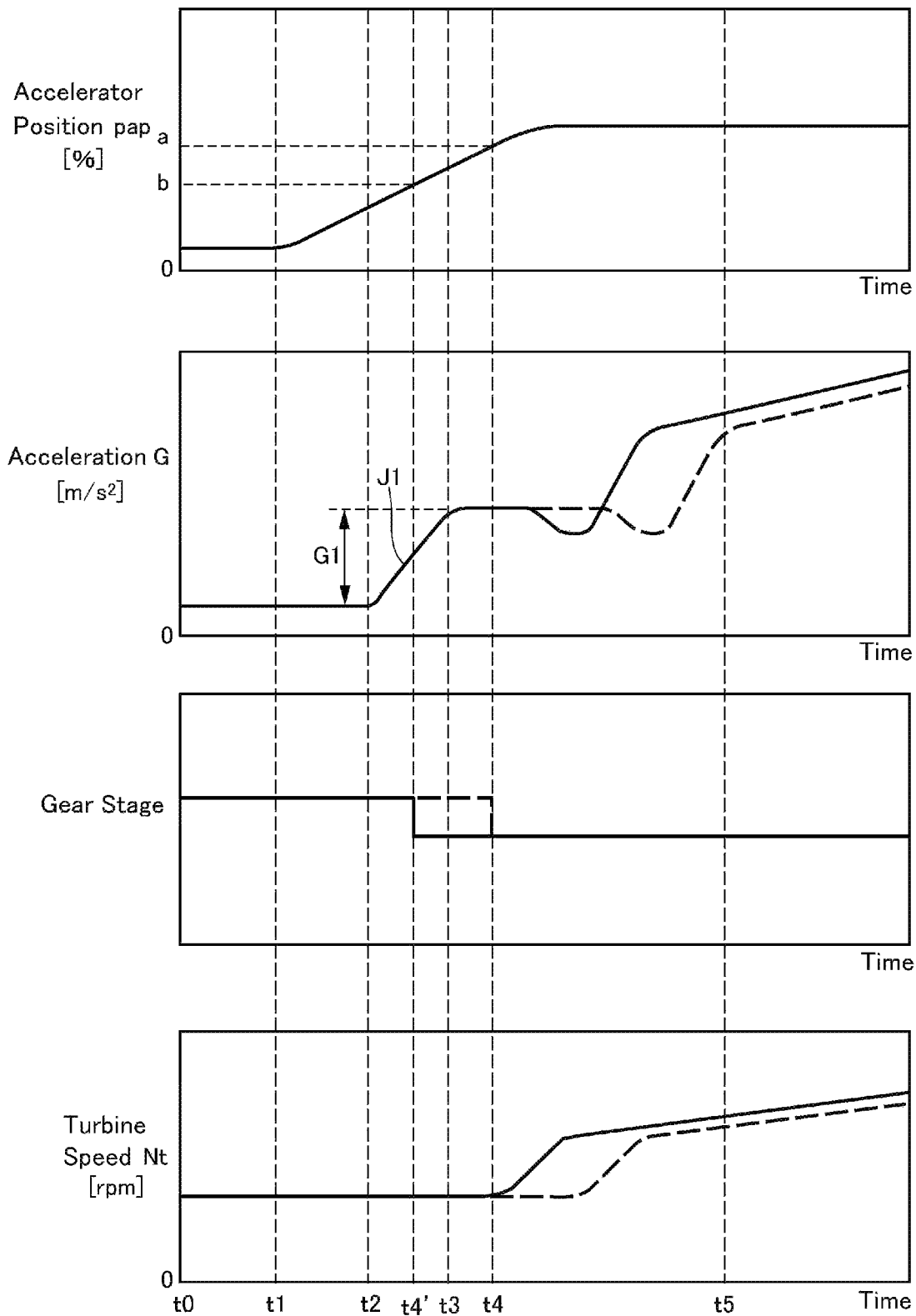
FIG. 6 is a time chart showing temporal changes in a position of an accelerator pedal, an acceleration, a command signal to set a gear stage, and a turbine speed during execution of the routine shown in FIG. 5.

FIG. 6 indicates chronological changes in the position of the accelerator pedal pap, the acceleration G, a signal to shift the gear stage, and the turbine speed Nt in a case where the downshift point is lowered during the execution of the routine illustrated in FIG. 5. Specifically, FIG. 6 shows a situation in which the position of the accelerator pedal pap is increased, and the first stimulation intensity Mi1 resulting from increase in the output torque of the engine 1 becomes smaller than the first threshold Ar. In FIG. 6, the dashed line indicates changes in the acceleration G, the signal to shift the gear stage, and the turbine speed Nt of the case in which the downshift point is not lowered.

In the example shown in FIG. 6, the events at points t0, t1, and t2 are the same as those of the example shown in FIG. 3. In the example shown in FIG. 6, the first stimulation intensity Mi1 is calculated on the basis of a jerk J1 and the acceleration G1 increasing from at point t3. Since the first stimulation intensity Mi1 thus calculated is smaller than the first threshold Ar, the downshift point is lowered from point a to point b in FIG. 2. As a result, the timing to start the downshifting is advanced from point t4 to point t4'.

The turbine speed Nt at a point of starting the downshifting is the same in either case where the downshift point is changed or not. Therefore, even in a case where the downshift point is lowered, a required time to downshift to the target stage will not be changed. By thus advancing the timing of starting the downshifting, a timing when the turbine speed Nt is increased, a timing when the acceleration G is increased again, or a timing when the downshifting is completed is advanced. In other words, a period of time from a point at which the accelerating operation is executed to a point at which the driver senses a change in behavior of the vehicle Ve is shortened.

Thus, if the first stimulation intensity Mi1 is equal to or smaller than the first threshold Ar, the downshift point is shifted to the lower side in the shift map. Consequently, the downshifting is executed at a smaller depression of the accelerator pedal. For this reason, a response to increase the acceleration by the accelerating operation is improved.

In addition, even if the acceleration plateaus, the downshift point is also lowered, and the timing of executing the downshifting is advanced. As a result, it is possible to reduce a delay from a timing at which the driver senses the commencement of the shifting operation to a point at which the acceleration starts. In other words, it is possible to shorten a time from the timing at which the driver senses the commencement of the shifting operation to a point at which the driver senses that the vehicle Ve is accelerated.

Figure 7:
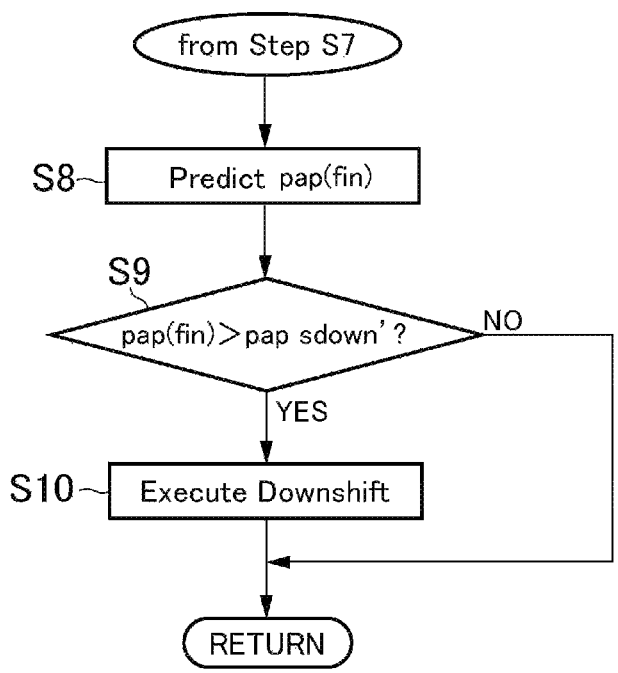
FIG. 7 is a flowchart showing a routine to execute a downshifting according to a predicted position of the accelerator pedal.

On the other hand, even if the downshift point is lowered, the downshifting will not be executed until the position of the accelerator pedal pap exceeds the lowered downshift point. In other words, the driver is not allowed to sense a change in behavior of the vehicle Ve caused by the accelerating operation until the position of the accelerator pedal pap exceeds the lowered downshift point. FIG. 7 shows a routine to further shorten a period in which the driver cannot sense a change in behavior of the vehicle Ve caused by the accelerating operation. Further, the routine illustrated in FIG. 7 is executed after step S7 in the routine shown in FIG. 5.

As described above, the downshift point is lowered at step S7. Thereafter, at step S8, a final position of the accelerator pedal pap(fin) in the current accelerating operation is predicted. For example, the final position pap(fin) can be calculated based on an acceleration G at the time of re-acceleration obtained based on a past running history and a current vehicle speed V(i), as disclosed in JP-A-2015-190815. To this end, a map using the vehicle speed V, the required drive force, and the position of the accelerator pedal pap as parameters is stored in the ECU 12, and the acceleration G at the time of re-acceleration is predicted with reference to the map. Then, the required drive force is calculated based on the predicted acceleration G, and the final position of the accelerator pedal pap(fin) is calculated based on the required drive force and the current vehicle speed V(i).

Then, at step S9, it is determined whether the final position of the accelerator pedal pap(fin) is greater than the lowered downshift point pap sdown'. If the final position of the accelerator pedal pap(fin) is smaller than the lowered downshift point pap sdown' so that the answer of step S9 is NO, the routine is returned without executing the downshifting.

By contrast, if the final position of the accelerator pedal pap(fin) is greater than the lowered downshift point pap sdown' so that the answer of step S9 is YES, the routine progresses to step S10 to execute the downshifting, and thereafter the routine returns. In this way, the downshifting is executed if the final position of the accelerator pedal pap(fin) is expected to exceed the lowered downshift point pap sdown', even though the current actual position of the accelerator pedal pap(i) does not exceed the lowered downshift point pap sdown'.

At step S10, the target gear stage N(fin) may be set to a gear stage (e.g., the third forward stage) that is two stages lower than the current gear stage N(i) (e.g., the fifth forward stage) on the basis of the final position of the accelerator pedal pap(fin). In this case, the gear stage may be shifted temporarily to an intermediate gear stage (e.g., the fourth forward stage) N(i)+1 that is one stage lower than the current gear stage, and then shifted to the target gear stage N(fin). Alternatively, the gear stage may also be shifted from the current gear stage N(i) directly to the target gear stage N(fin) while skipping the intermediate gear stage N(i)+1.

Thus, in a case where the final position of the accelerator pedal pap(fin) is expected to exceed the lowered downshift point pap sdown', the downshifting is started before the actual position of the accelerator pedal pap exceeds the lowered downshift point pap sdown'. Therefore, the driver is allowed to promptly sense a change in behavior of the vehicle Ve caused by the accelerating operation, and an increase in the acceleration.

According to the experiment performed by the applicant of this application, it has also been found out that the acceleration response and the index value at which the driver can sense the acceleration vary according to an operation speed of the accelerator pedal. Specifically, in a case where the accelerator pedal 4 is depressed at a speed higher than a predetermined speed, a response of the acceleration is sensed according to the index value In, and a magnitude of the acceleration is sensed according to the stimulation intensity Mi. By contrast, in a case where the accelerator pedal is depressed at a speed lower than the predetermined speed, a response of the acceleration is sensed according to the acceleration G, and a magnitude of the acceleration is sensed according to the jerk J.

In order to set the predetermined speed, data about the acceleration G and the jerk J at which a plurality of drivers sensed the response of the acceleration and the magnitude of the acceleration was collected while driving a vehicle by their own manners. On the basis of the collected data, tendency of the drivers to sense the acceleration according to the operation speed of the accelerator pedal is evaluated, and the predetermined speed is set on the basis of the evaluated data.

Figure 8:
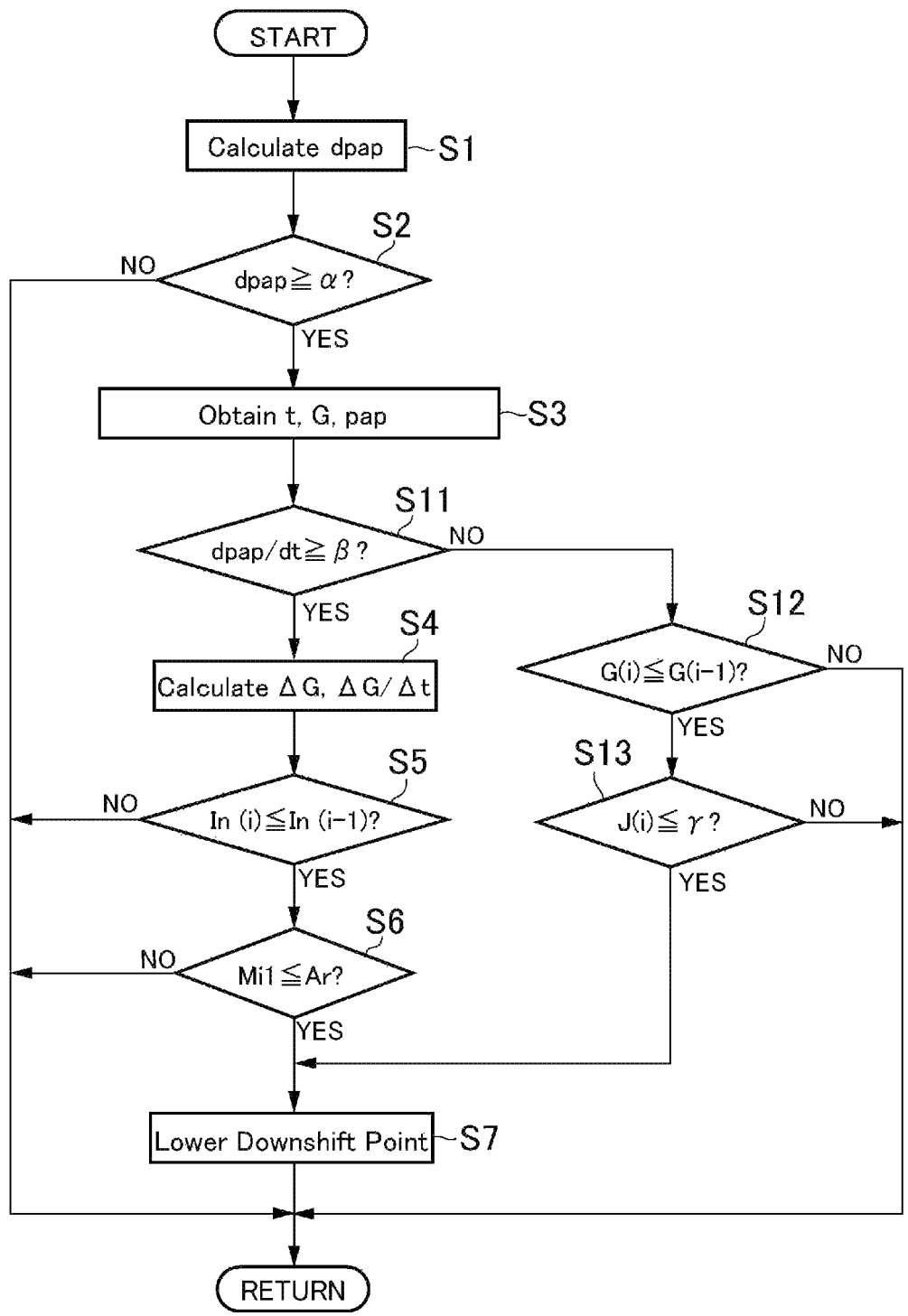
FIG. 8 is a flowchart illustrating a routine to switch an index value which is used to determine whether a downshift point is lowered according to a change rate of the position of the accelerator pedal.

FIG. 8 shows a routine to change a downshift point pap sdown according to the operation speed of the accelerator pedal 4. In the following explanation, detailed explanation for the steps in common with those of the routine shown in FIG. 5 will be omitted.

In the routine shown in FIG. 8, the routine progresses from step S3 to step S11 to determine whether a change rate dpap/dt of the position of the accelerator pedal 4 is equal to or greater than a predetermined speed β which is set by the above-explained procedure. The predetermined speed β corresponds to "first speed", "second speed", "third speed", and "fourth speed" in this embodiment. The change rate dpap/dt of the position of the accelerator pedal 4 can be obtained by dividing a change Δpap of the position of the accelerator pedal pap from a point at which the accelerator pedal 4 was depressed to the present point of time, by an elapsed time from the point at which the accelerator pedal 4 was depressed to the present point of time.

If the change rate dpap/dt of the position of the accelerator pedal 4 is equal to or greater than the predetermined speed β so that the answer of step S11 is YES, the routine progresses to step S4. By contrast, if the change rate dpap/dt of the position of the accelerator pedal 4 is smaller than the predetermined speed β so that the answer of step S11 is NO, the routine progresses to step S12 to determine whether a current acceleration G(i) is equal to or smaller than an acceleration G(i−1) in the last routine, so as to determine whether the acceleration plateaus.

If the current acceleration G(i) is greater than the acceleration G(i−1) in the last routine so that the answer of step S12 is NO (that is, if the acceleration does not plateau), the routine returns. By contrast, if the current acceleration G(i) is equal to or smaller than the acceleration G(i−1) in the last routine so that the answer of step S12 is YES, the routine progresses to step S13 to determine whether the driver could sense an acceleration when the output torque of the engine 1 is increased to increase the acceleration G. Specifically, at step S13, it is determined whether a current jerk J(i) is equal to or less than a predetermined value γ. As described above, in a case where the operation speed of the accelerator pedal 4 is relatively slow, the magnitude of the acceleration is sensed according to the jerk J. Therefore, the jerk at which the driver sensed a change in behavior of the vehicle Ve caused by the accelerating operation is obtained from the experiment, and employed as the predetermined value γ.

If the jerk J is greater than the predetermined value γ, that is, if the driver can sense an acceleration when the output torque of the engine 1 is increased so that the answer of step S13 is NO, the routine returns. By contrast, if the jerk J is equal to or less than the predetermined value γ, that is, if the driver cannot sense an acceleration when the output torque of the engine 1 is increased so that the answer of step S13 is YES, the routine progresses to step S7 to lower the downshift point pap sdown to advance the timing of executing the downshifting.

In this way, the index value at which the driver can sense the acceleration may be altered according to the change rate dpap/dt of the position of the accelerator pedal 4. Therefore, the downshift point pap sdown can be appropriately lowered in line with a driver's preference. In other words, the downshift point pap sdown can be lowered to execute the downshifting at an intended timing.

Figure 9:
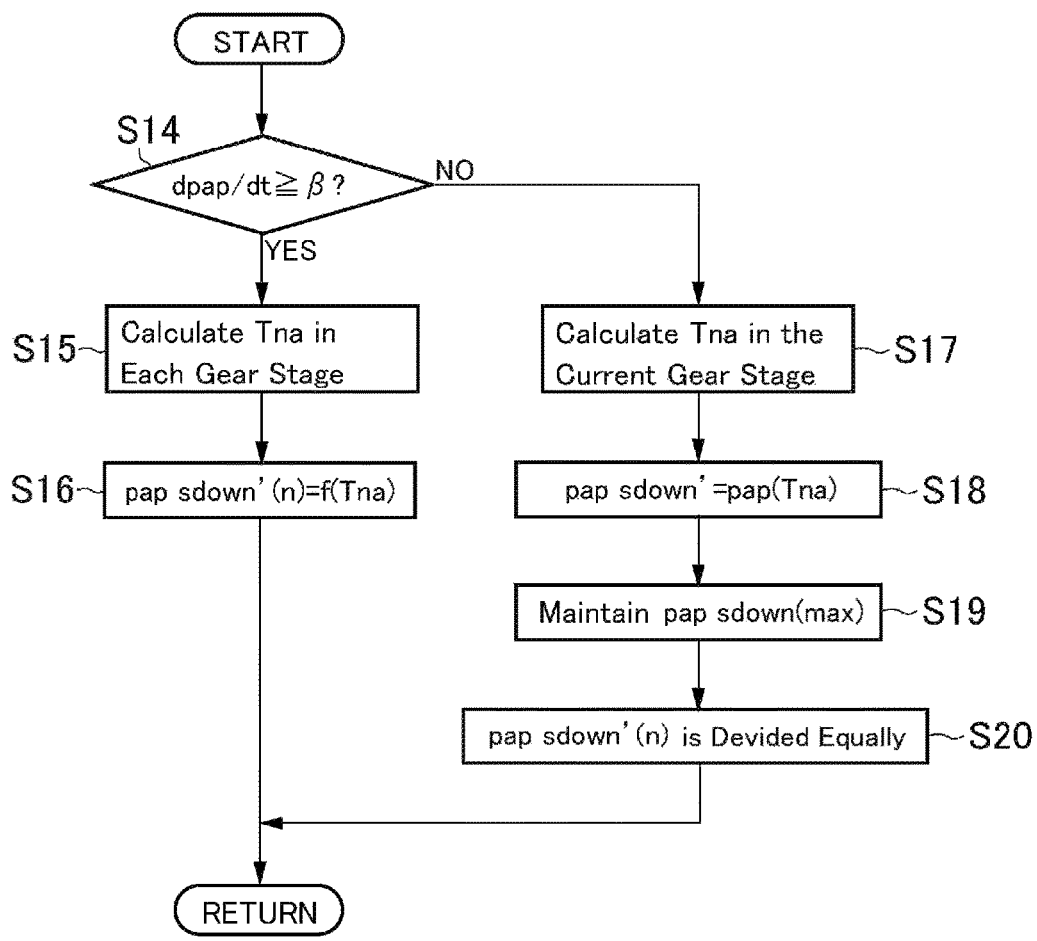
FIG. 9 is a flowchart showing a routine to set a downshift point to be lowered.

FIG. 9 is a subroutine of step S7 of the routine shown in FIG. 5 executed to set the downshift point pap sdown to be lowered. At step S14, it is determined whether the change rate dpap/dt of the position of the accelerator pedal 4 is equal to or greater than the predetermined speed β.

If the change rate dpap/dt of the position of the accelerator pedal 4 is equal to or greater than the predetermined speed β so that the answer of step S14 is YES, the routine progresses to step S15 to calculate a maximum torque Tna of the engine 1 which can be generated in the NA region in each gear stage. Specifically, the maximum torque Tna(i) of the engine 1 in the NA region in the current gear stage N(i), and the maximum torque Tna of the engine 1 in the NA region in the gear stage N(i)+1 that is one stage lower than the current gear stage N(i) are calculated. In addition, the maximum torque Tna is calculated in each gear stage possible to be established at the current vehicle speed V(i). The maximum torque Tna of the engine 1 which can be generated in the NA region is calculated based on an engine speed at the current the vehicle speed V(i). The maximum torque Tna corresponds to "predetermined torque" in this embodiment.

Then, at step S16, positions of the accelerator pedal pap na(n) corresponding to the calculated maximum torques Tna in the NA region in each gear stage are calculated, and the positions of the accelerator pedal pap na(n) are employed as the downshift points pap sdown'(n). Thereafter, the routine returns. Step S15 is executed to eliminate the response delay in torque when the operating point of the engine 1 is shifted from the NA region to the supercharge region. Therefore, if the speed of the engine 1 is already high and the operating point is in the supercharge region, the position of the accelerator pedal 4 corresponding to the maximum torque of the supercharge region may also be used as the downshift point.

When the engine 1 is operated by depressing the accelerator pedal 4 to the downshift point pap sdown, the output torque of the engine 1 is greater than the maximum torque Tna in the NA region. Therefore, at step S16, all of the downshift points pap sdown are lowered.

When accelerating the vehicle Ve abruptly, by depressing the accelerator pedal 4 more than a predetermined amount, a so-called kick-downshifting is executed to expedite the downshifting. In this case, if a downshift point pap sdown (max) is lowered, the driver may feel uncomfortable feeling. Therefore, at step S16, the downshift point pap sdown(max) to execute the kick-downshifting may be set to the downshift point pap sdown(max) which has already been set in the shift map.

By contrast, if the change rate dpap/dt of the position of the accelerator pedal 4 is smaller than the predetermined speed β so that the answer of step S14 is NO, the routine progresses to step S17 to calculate the maximum torque Tna(i) of the engine 1 in the NA region in the current gear stage N(i) by the same procedure as step S15.

Then, at step S18, the position of the accelerator pedal pap na to achieve the maximum torque Tna(i) calculated at step S17, and the position of the accelerator pedal pap na is set as the downshift point pap sdown'. Then, at step S19, the downshift point pap sdown(max) is maintained to execute the kick-downshifting.

Then, at step S20, a difference between: the position of the accelerator pedal pap na corresponding to the downshift point pap sdown'; and a position of the accelerator pedal pap(max) corresponding to the downshift point pap sdown (max) at which the kick-downshifting is executed, is divided equally by the number of gear stages interposed between the current gear stage N(i) and a gear stage N(max) at the kick-downshifting is executed. In other words, the downshift points pap sdown(n)' to execute the downshifting to the gear stages N(n) is set in such a manner as to equalize each interval Δpap between the downshift lines. Thereafter, the routine returns. As a result, the downshifting is executed every time the position of the accelerator pedal pap is changed by a predetermined amount. In other words, the driver is allowed to shift the gear stage to the desired stage by manipulating the accelerator pedal 4. Alternatively, the change Δpap of the position of the accelerator pedal 4 to downshift to the next gear stage N+1 may be increased every time the gear stage N is shifted to the stage one stage lower than the current stage.

The downshift point pap sdown(n)' which is set in a case where the change rate dpap/dt of the position of the accelerator pedal 4 is equal to or greater than the predetermined speed β is smaller than the downshift point pap sdown(n)' which is set in a case where the change rate dpap/dt of the position of the accelerator pedal is smaller than the predetermined speed β. That is, in a case where the change rate dpap/dt of the position of the accelerator pedal 4 is equal to or greater than the predetermined speed β, the downshifting is executed more promptly.

The downshift lines containing the downshift points pap sdown', pap sdown(n)', pap sdown(max) set at steps S17 to S20 are indicated by the solid lines in FIG. 2. In FIG. 2, V1 is the current vehicle speed V(i), and the dashed lines indicate the downshift points pap sdown installed in the ECU 12.

In the following, the description will be given about an example in which the accelerator pedal 4 is depressed, and the kick-downshifting is executed to shift the gear stage from the sixth forward stage to the second forward stage while carrying out steps S17 to S20. First of all, the downshift point to the fifth forward stage is lowered to the downshift point (pap sdown' in FIG. 2) in accordance with a torque that the engine 1 can generate in the NA region in the sixth forward stage. In this situation, the downshift point (pap sdown'(n) in FIG. 2) to the second forward stage is maintained. Then, a difference between the downshift point to the fifth forward stage and the downshift point to the second forward stage is equally divided into three. Specifically, a difference (Δpap in FIG. 2) between the downshift point to the fifth forward stage and the downshift point to the fourth forward stage, a difference (Δpap in FIG. 2) between the downshift point to the fourth forward stage and the downshift point to the third forward stage, and a difference (Δpap in FIG. 2) between the downshift point to the third forward stage and the downshift point to the second forward stage are equalized. Then, the downshift point to the fourth forward stage and the downshift point to the third forward stage are set.

Pap sdown' shown in FIG. 2 corresponds to "first drive force" and "second drive force" in the embodiment of the disclosure, the lowest value of pap sdown'(n) shown in FIG. 2 corresponds to "third drive force" in the embodiment of the disclosure, and the second lowest value of pap sdown'(n) shown in FIG. 2 corresponds to "fourth drive force" in the embodiment of the disclosure.

As described above, the downshift point pap sdown' is set to execute the first downshifting operation according to the maximum torque Tna of the engine 1 which can be generated in the NA region. Therefore, it is possible to shorten the acceleration plateau period resulting from response delay when the operating point of the engine 1 shifts from the NA region to the supercharge region. As also described, the driver recognizes that the commencement of downshifting by the acceleration plateau. According to the embodiment, therefore, the downshifting may be started at a driver's intended timing.

In addition, in a case where the change rate dpap/dt of the position of the accelerator pedal is equal to or greater than the predetermined speed β, the downshift points pap sdown (n)' are set on the basis of the maximum torque Tna of the engine 1 which can be output in the NA region. Therefore, the downshifting can be started at the same time as the output torque of the engine 1 plateaus. In other words, the downshifting can be started according to a driver's intention at a point when the driver recognizes the commencement of the downshifting by the acceleration plateau. When a greater drive force is required, the change rate dpap/dt of the position of the accelerator pedal 4 is fast. In this case, the downshift points pap sdown(n)' to all the gear stages are lowered except the kick-downshifting. Therefore, the gear stage of a relatively greater speed ratio is easily selected, and the skip downshifting is easily executed. As a result, it is possible to promptly generate the required drive force.

Further, in a case where the change rate dpap/dt of the position of the accelerator pedal 4 is smaller than the predetermined speed 13, the downshift points pap sdown(n) are set in such a manner that the downshifting starts whenever the position of the accelerator pedal pap is changed by a predetermined amount. Therefore, the driver is allowed to shift the gear stage to the desired stage by manipulating the accelerator pedal 4. In addition, when changing the drive force mildly, the change rate dpap/dt of the position of the accelerator pedal 4 is slow. In this case, the downshift points pap sdown(n)' are set without getting too close to one another. Therefore, the skip downshifting will not be executed easily, and hence the drive force will not be increased excessively.

Figure 10:
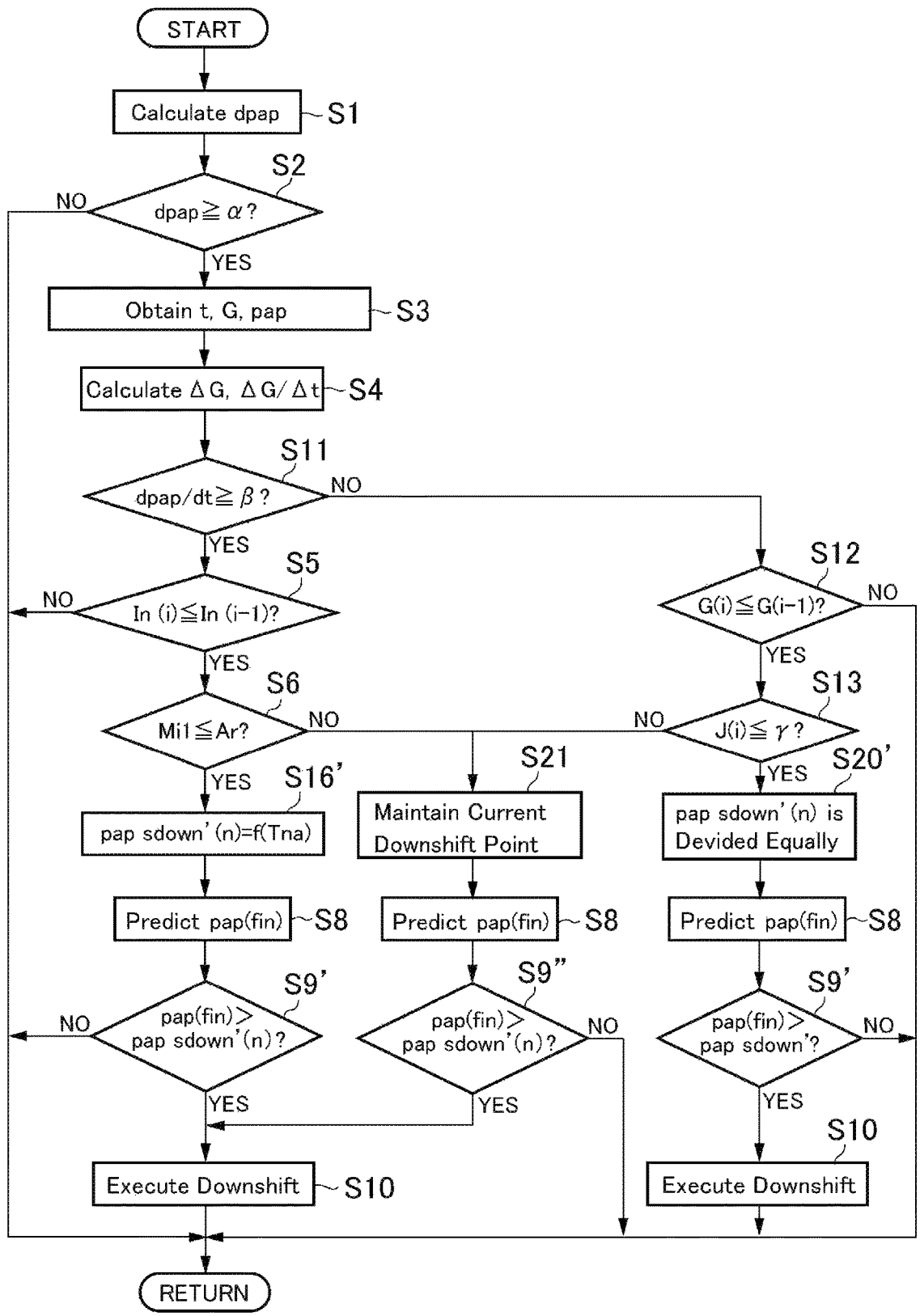
FIG. 10 is a flowchart showing an example of executing the routines of FIGS. 5, 7, 8, and 9 in a continuous flow.

The control examples described above may be executed in a continuous flow as shown in FIG. 10.

At step S1, a change dpap of the position of the accelerator pedal 4 is calculated. At step S2, it is determined whether the change dpap of the position of the accelerator pedal 4 is equal to or greater than a third threshold a. If the answer of step S2 is NO, the routine is returned immediately.

Then, if the answer of step S2 is YES, the routine progresses to step S3 to obtain a point t, the acceleration G, and the position pap of the accelerator pedal when the accelerator pedal 4 is depressed from the ECU 12. Then, at step S4, the change ΔG of the acceleration from a time point at which the acceleration is demanded to the present time, and the temporal change rate ΔG/Δt of the acceleration are calculated.

Then, the routine progresses to step S11 to determine whether the change rate dpap/dt of the position of the accelerator pedal 4 is equal to or greater than the predetermined speed β which is determined as described above.

If the change rate dpap/dt of the position of the accelerator pedal 4 is equal to or greater than the predetermined speed β so that the answer of step S11 is YES, the routine progresses to step S5 to determine whether the current index value In(i) is equal to or smaller than the index value In(i−1) of the last routine. If the current index value In(i) is greater than the index value In(i−1) of the last routine so that the answer of step S5 is NO, the routine returns.

By contrast, if the current index value In(i) is equal to or smaller than the index value In(i−1) of the last routine so that the answer of step S5 is YES, the routine progresses to step S6 to determine whether the first stimulation intensity Mi1 is equal to or smaller than the first threshold Ar. If the first stimulation intensity Mi1 is equal to or smaller than the first threshold Ar so that the answer of step S6 is YES, the routine progresses to step S16' to set the position pap na(n) of the accelerator pedal 4 as the downshift point pap sdown'(n) to the respective gear stages on the basis of the maximum torque Tna in the NA region in the respective gear stages. The contents of step S16' are similar to those of steps S15 and S16.

Then, the final position pap(fin) of the accelerator pedal 4 in the current accelerating operation is predicted at step S8, and at step S9', it is determined whether the final position pap(fin) of the accelerator pedal is greater than the lowered downshift point pap sdown(n)'. In the foregoing embodiment, such downshift point lowered at step S9 has been described without setting the downshift point to the specific point. On the other hand, in the routine shown in FIG. 10, the downshift point is set at step S16'. Therefore, at step S9', it is determined whether the final position pap(fin) of the accelerator pedal 4 is greater than the downshift point pap sdown(n)' set at step S16' to serves as a boundary between the current gear stage and the adjacent lower gear stage.

If the final position pap(fin) of the accelerator pedal 4 is greater than the lowered downshift point pap sdown(n)' so that the answer of step S9' is YES, the routine progresses to step S10 to execute the downshifting. By contrast, if the final position pap(fin) of the accelerator pedal 4 is equal to or smaller than the lowered downshift point pap sdown(n)' so that the answer of step S9' is NO, the routine returns.

Otherwise, if the first stimulation intensity Mi1 is greater than the first threshold Ar so that the answer of step S6 is NO, the routine progresses to step S21 to maintain the current downshift point. In other words, the downshift point set in the shift map is not changed. Next, at step S8, the final position pap(fin) of the accelerator pedal 4 in the current accelerating operation is predicted. At step S9", it is determined whether the final position pap(fin) of the accelerator pedal 4 is greater than the downshift point pap sdown set in the shift map. In this case, the driver is allowed to sense an increase in the acceleration and hence there is no need to change the downshift point. However, if the downshifting will be executed in future, it is desirable to execute the downshifting promptly. For this reason, the determination of step S9" is performed.

If the final position pap(fin) of the accelerator pedal 4 is greater than the downshift point pap sdown(n) so that the answer of step S9" is YES, the routine progresses to step S10 to execute the downshifting. By contrast, if the final position pap(fin) of the accelerator pedal 4 is equal to or smaller than the downshift point pap sdown(n) so that the answer of step S9" is NO, the routine returns.

If the change rate dpap/dt of the position of the accelerator pedal 4 is smaller than the predetermined speed β so that the answer of step S11 is NO, the routine progresses to step S12 to determine whether the current acceleration G(i) is equal to or smaller than the acceleration G(i−1) in the last routine. If where the current acceleration G(i) is greater than the acceleration G(i−1) in the last routine so that the answer of step S12 is NO, the routine returns.

By contrary, if the current acceleration G(i) is equal to or less than the acceleration G(i−1) in the last routine so that the answer of step S12 is NO, the routine progresses to step S13 to determine whether the jerk J(i) when the output torque of the engine 1 is increased to increase the acceleration G is equal to or smaller than the predetermined value γ. If the jerk J(i) is equal to or smaller than the predetermined value γ so that the answer of step S13 is YES, the routine progresses to step S20' to equalize the interval Δpap between the downshift points, and to set the downshift point pap sdown(n)' at which the downshifting to the respective gear stage N(n) is executed. The contents of step S20' are identical to those of steps S18 to S20.

Then, the final position pap(fin) of the accelerator pedal 4 in the current accelerating operation is predicted at step S8, and at step S9', it is determined whether the final position pap(fin) of the accelerator pedal 4 is greater than the lowered downshift point pap sdown(n)'. In the foregoing embodiment, such downshift point lowered at step S9 has been described without setting the downshift point to the specific point. On the other hand, in the routine shown in FIG. 10, the downshift point is set at step S20'. Therefore, at step S9', it is determined whether the final position pap(fin) of the accelerator pedal is greater than the downshift point pap sdown(n)' which is set at step S20' to serves as a boundary between the current gear stage and the adjacent lower gear stage.

If the final position pap(fin) of the accelerator pedal 4 is greater than the lowered downshift point pap sdown' so that the answer of step S9' is YES, the routine progresses to step S10 to execute the downshifting. By contrast, if the final position pap(fin) of the accelerator pedal 4 is equal to or less than the lowered downshift point pap sdown' so that the answer of step S9' is NO, the routine returns.

In a case where the jerk J(i) is greater than the predetermined value γ so that the answer of step S6 is NO, steps S21, S8, and S9" are executed. Thereafter, the routine returns.

Further, in the above-described examples, the downshift point is lowered in a case where the first stimulation intensity Mi1 is equal to or less than the first threshold Ar. Alternatively, the downshift point may be lowered in a case where the plateau period (T1 in FIG. 3) from the acceleration request to the start of acceleration increase is equal to or greater than the time Tmax which is a maximum period of time when the driver does not sense the response delay with respect to the accelerating operation.

Although the above exemplary embodiments of the present disclosure have been described, it will be understood by those skilled in the art that the present disclosure should not be limited to the described exemplary embodiments, and various changes and modifications can be made within the spirit and scope of the present disclosure.

What is claimed is:

1. A speed change control system of an automatic transmission, comprising:
    an automatic transmission adapted to change a speed ratio stepwise that is arranged between an engine serving as a prime mover of a vehicle and a drive wheel; and
    a controller that transmits a downshift command when a required drive force is increased higher than a predetermined downshift point,
    wherein the controller is configured to:
    calculate a reference index value based on a change in the acceleration of the vehicle that a driver senses an increase in an acceleration feeling with an increase in the reference index value; and
    lower the predetermined downshift point to a first drive force when the reference index value is equal to or smaller than a first reference index value at which the driver is allowed to sense a change in behavior of the vehicle caused by an accelerating operation, in comparison with that of a case in which the reference index value is greater than the first reference index value.

2. The speed change control system of the automatic transmission according to claim 1, wherein the reference index value includes a stimulation intensity calculated by multiplying the change in the acceleration from a point at which the vehicle starts accelerating to a point at which the driver senses that an acceleration plateaus, by a jerk from a point at which the vehicle starts accelerating to a point at which the driver senses that the acceleration plateaus.

3. The speed change control system of the automatic transmission according to claim 1, wherein the controller is further configured to:
    calculate a change rate of the required drive force;
    set a jerk from a point at which the vehicle starts accelerating to a point at which the driver senses that an acceleration plateaus as the reference index value, when the change rate of the required drive force is smaller than a first speed;
    calculate a stimulation intensity by multiplying the change in the acceleration from the point at which the vehicle starts accelerating to the point at which the driver senses that the acceleration plateaus by the jerk from the point when the vehicle starts accelerating to the point at which the driver senses that the acceleration plateaus; and set the calculated stimulation intensity as the reference index value when the change rate of the required drive force is equal to or greater than the first speed.

4. The speed change control system of the automatic transmission according to claim 1, wherein the controller is further configured to:
calculate an index value based on the acceleration of the vehicle that the driver senses an acceleration plateau when the index value is not increased;
determine whether the index value is increased; and
lower the downshift point to the first drive force when the index value is not increased, in comparison with that of a case in which the index value is increased.

5. The speed change control system of the automatic transmission according to claim 4, wherein the index value includes a value calculated by multiplying the change in the acceleration from the point at which the vehicle starts accelerating by a temporal change rate of the acceleration obtained by dividing the change of acceleration by an elapsed time from a point at which the vehicle starts accelerating.

6. The speed change control system of the automatic transmission according to claim 4, wherein the controller is further configured to:
calculate a change rate of the required drive force;
set the acceleration of the vehicle as the index value when the change rate of the required drive force is smaller than a first speed; and
calculate a value by multiplying the change in the acceleration from the point at which the vehicle starts accelerating, by the temporal change rate of the acceleration calculated by dividing the change of the acceleration by an elapsed time from a point at which the vehicle starts accelerating; and
set the calculated value as the index value when the change rate of the required drive force is equal to or greater than the first speed.

7. The speed change control system of the automatic transmission according to claim 1, wherein the controller is further configured to:
predict a final drive force required by the driver;
determine whether the predicted required drive force exceeds the downshift point; and
transmit a downshift command when the predicted required force exceeds the downshift point, even if a current required drive force does not exceed the first drive force.

8. The speed change control system of the automatic transmission according to claim 1, further comprising:
a supercharger that supplies a pressurized air to the engine,
wherein the controller is further configured to
operate the supercharger when a torque required for the engine is equal to or greater than a predetermined torque,
calculate the predetermined torque to operate the supercharger, and
set the first drive force to a drive force at which the torque required for the engine becomes the predetermined torque.

9. The speed change control system of the automatic transmission according to claim 1,
wherein the automatic transmission is adapted to shift a gear stage at least among a current gear stage, a first gear stage in which the speed ratio is greater than that in the gear stage, and a second gear stage in which the speed ratio is greater than that in the first gear stage, and
the controller is further configured to
shift the gear stage from the current gear stage to the first gear stage when the required drive force in the current gear stage is increased higher than a first downshift point,
shift the gear stage from the first gear stage to the second gear stage when the required drive force in the first gear stage is increased higher than a second downshift point which is high than the first downshift point, and
lower the first downshift point to a second drive force that is smaller than that of a case in which the index value is increased, and lower the second downshift point to a third drive force that is smaller than that of a case in which the index value is increased, when the index value is not increased.

10. The speed change control system of the automatic transmission according to claim 9, wherein the controller is configured to:
obtain the change rate of the required drive force,
reduce the second drive force to a value smaller than that of a case in which the change rate of the required drive force is smaller than a first speed, and reduce the third drive force to a smaller value, when the change rate of the required drive force is equal to or greater than the first speed.

11. The speed change control system of the automatic transmission according to claim 9,
wherein the automatic transmission is further adapted to establish a third gear stage in which a speed ratio is greater than that in the second gear stage, and
the controller is configured to
shift the gear stage to the third gear stage when the required drive force in the second gear stage is increased higher than a third downshift point which is greater than the second downshift point,
lower the third downshift point to a fourth drive force which is smaller than that of a case in which the index value is increased, when the index value is not increased,
calculate the change rate of the required drive force, and
set the third drive force and the fourth drive force in such a manner that a difference between the second drive force and the third drive force and a difference between the third drive force and the fourth drive force are equalized, when the change rate of the required drive force is smaller than a first speed.

* * * * *